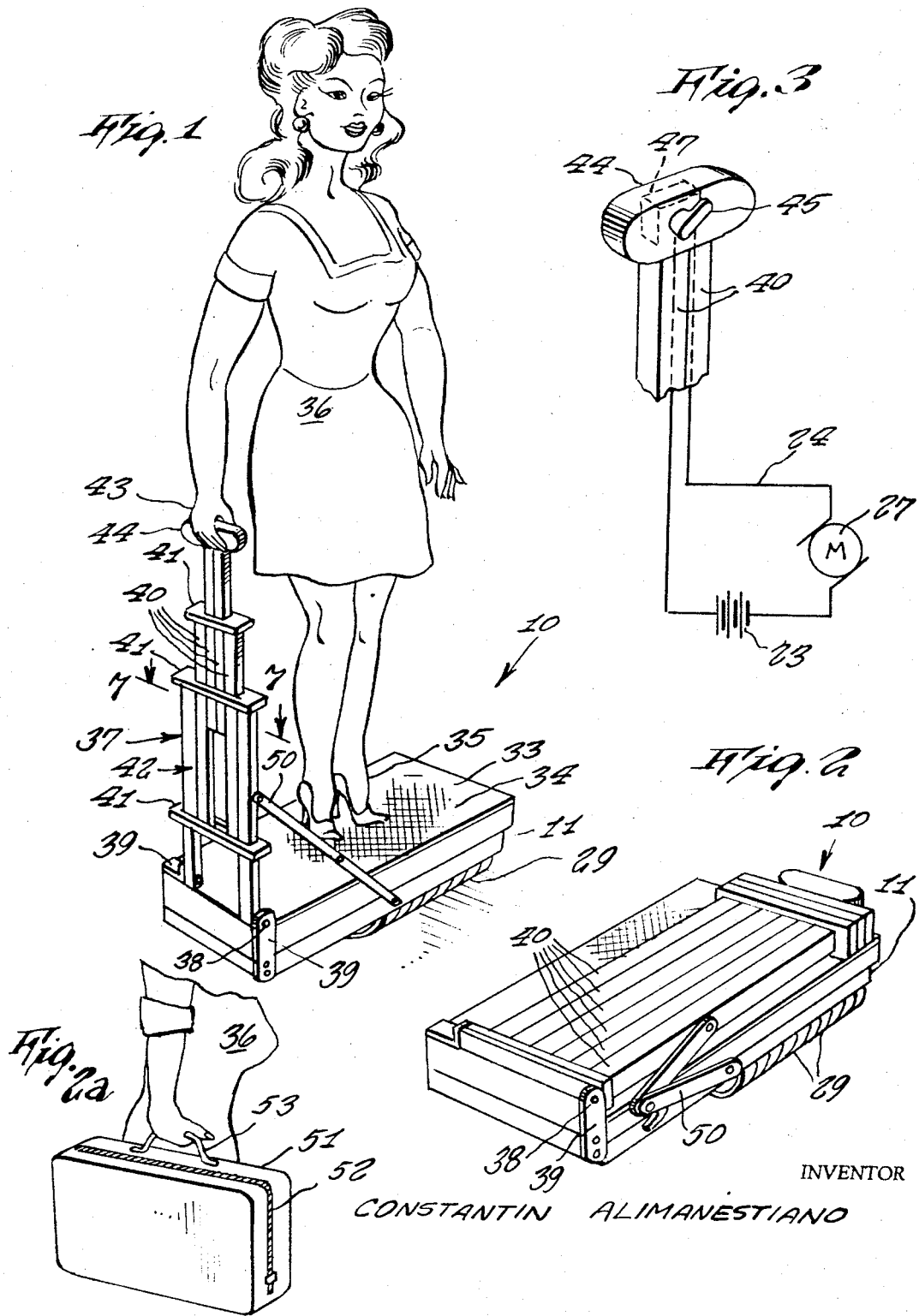

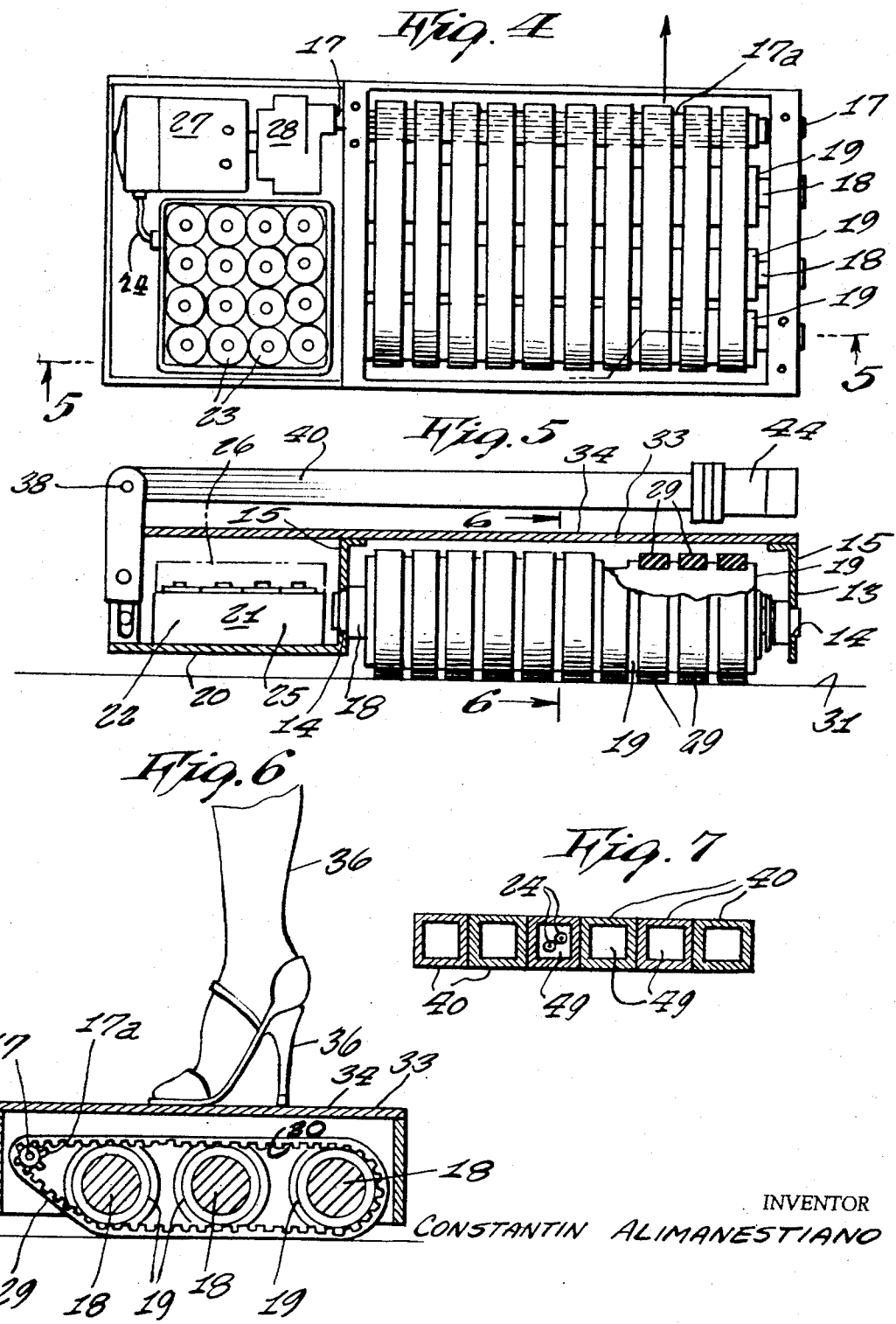

United States Patent Office 3,446,304
Patented May 27, 1969

3,446,304
PORTABLE CONVEYOR
Constantin Alimanestiano, 200 S. Michigan Ave., Chicago, Ill. 60604
Filed Aug. 8, 1966, Ser. No. 571,026
Int. Cl. B62d *11/00*; B60k *1/00*; B62b *1/00*
U.S. Cl. 180—9.24                                              1 Claim

ABSTRACT OF THE DISCLOSURE

A portable self-powered conveyor for transporting a person standing thereupon and having a handle for controlling speed and direction.

---

This invention relates generally to portable conveyors. More specifically it relates to self powered portable conveyors.

A principal object of the present invention is to provide an improved conveyor that is self-powered, which is capable of transporting a person standing thereupon, and which is light enough to be carried in the person's hand when riding thereupon is not appropriate or feasible.

Another object is to provide a portable conveyor having the above object, which is readily collapsible when not in use, so to make a small unit when being carried or stored in a minimum space.

Yet another object is to provide a portable conveyor that is quickly convertable from a collapsed position to an expanded operative position.

Yet another object is to provide a portable conveyor having an adjustable steering and control handle to accommodate riders of various heights without the necessity of the rider to stoop while operating the device.

These and other objects will be readily evident upon a study of the following specification and the accompanying drawing wherein:

FIGURE 1 is a perspective view of the invention shown expanded and in operative use, FIGURE 2 is a perspective view thereof shown in collapsed inoperative position, FIGURE 2a is a perspective view of the device shown in a plastic case, and being carried in a person's hand, FIGURE 3 is a mechanical-electrical diagrammatic view of the power system, FIGURE 4 is a top plan view of the device with the cover plates removed therefrom, FIGURE 5 is a cross-sectional view taken on line 5—5 of FIGURE 4, FIGURE 6 is a cross-sectional view taken on line 6—6 of FIGURE 5; and FIGURE 7 is a cross-sectional view taken on line 7—7 of FIGURE 1.

Referring now to the drawing in detail, the numeral 10 represents a conveyor according to the present invention, wherein there is a chassis 11 supported upon a plurality of rollers 18.

The chassis includes a frame 13 made from light weight yet relatively strong sheet metal. Bearings 14 are provided upon opposite side walls 15 for supporting four shafts therebetween, one of which, 17, is a drive shaft and the other three shafts 18 are rotatable and carry rubber covered rollers 19.

At one side end of the frame 13, there is an integral platform 20 upon which a battery unit 21 is secured. The battery unit comprises a housing 22 containing space for a large number of dry cell batteries 23, the housing having appropriate wiring 24 in the case 25 and cover 26 thereof, for carrying electrical power from the batteries to a motor 27 also mounted on the platform. The motor drives through a gear reduction unit 28 connected at one end of the drive shaft 17.

A gear 17a is mounted on shaft 17, the gear 17a being engaged by a plurality of spaced apart endless belts 29 having teeth 30 for engagement therewith. All of the belts 29 are passed around the entire group of rollers 19 as shown in FIGURE 6, so to drive the rollers. Although the belts are toothed the rollers are not because the rollers merely function as rolling supports for the belts similar to the function of pulley sheaves. As shown in FIGURES 5 and 6, the belts 30 are in engagement with a surface 31 across which the jog-a-long travels.

A flat cover plate 33 encloses the above described mechanism mounted on the platform 20, and the upper side of the drive shaft and rollers. The upper surface 34 of the plate 33 is calendered or rubber covered to prevent the feet 35 of a rider 36 from slipping therefrom when standing thereupon.

The cassis further carries a control handle 37 pivotally mounted at its lower end on a pin 38 secured to lugs 39 mounted on the chassis. The control handle is pivotable between an extended position, as shown in FIGURE 1 and a collapsed position, as shown in FIGURE 2.

The control handle is comprised of a plurality of square tubular members 40 adjacent each other and slidable alongside one another. The members 40 are connected at their one ends to yokes 41 to form slidable frames 42; the frame 42 being slidable relative to one another in a longitudinal direction so to provide height to the control handle when in an operative position, so that a person's hand 43 may reach conveniently the upper end 44 of the control handle without need to stoop.

The upper end 44 contains an exposed lever 45 for controlling the speed of the vehicle from start to top speed, and any other controls that may be desirable. An electric wire circuit 24 communicates between a rheostat 47 operated by the lever and the motor 27 and batteries 23. The wires 24 of the circuit extend through one of the openings 49 in one of the tube members from the upper end 44 to the mechanism mounted on the platform 20. A pair of foldable arresting arms 50 normally lock the control handle in upright vertical position to prevent pivoting thereof during riding operation.

When the device is not in use, it may be collapsed and carried within a plastic case 51 having a slide fastener opening 52 and a handle 53.

In operative use, a person simply carries the collapsed device in case 51 (as shown in FIGURE 2a) from the place of storage to the street or other place where he wishes to begin his ride. The jog-a-long is removed from the case 51 placed on the street or sidewalk surface, the control handle pivoted upward, the person then stepping on the cover plate 33, telescoping upwardly the control handle to the length desired for convenience, and then turning the control lever to the starting speed, thus actuating conveyor to move across the ground. By moving the lever further, the speed is accelerated as desired.

The present portable conveyor may be steered by the rider so to make turns at corners and travel into any desired direction. Due to the weight of a person being above the rollers, and the control angle to the side, the person can steer by simply pulling or pushing the handle abruptly. With only little practice a person can become adapt at steering the device perfectly.

Thus a convenient riding device has been shown that can be easily carried by the rider such as when climbing a stair, crossing a carpeted lobby, going up an elevator, or other area, wherein riding is not feasible.

Having thus set forth and disclosed the nature of this invention, what is claimed is:

1. In a portable conveyor, a platform mounted wholly over a plurality of parallel rollers in combination with an endless belt mounted about said rollers having a ground bearing portion contacting said rollers and parallel to said platform and a plane passing through the centers of said rollers in combination with a driving gear, offset from the ground bearing portion of the belt in driving engagement with said belt, said platform having walls depending from the platform and the rollers extend continuously between the walls and are mounted in bearings provided in the walls, including means for driving the gear and for steering the conveyor, the last said means including a handle extending vertically from the platform and laterally to one side thereof, said handle being pivoted from the vertical to a horizontally folded position parallel to and closely adjacent the platform.

References Cited

UNITED STATES PATENTS

| | | | |
|---|---|---|---|
| 2,770,310 | 11/1956 | Gates | 180—9.22 |
| 3,084,949 | 4/1963 | Forster | 280—47.37 X |
| 3,204,716 | 9/1965 | Phillips | 180—9.24 X |
| 3,314,494 | 4/1967 | Weitzner | 180—27 |
| 1,509,297 | 9/1924 | Jacobs | 305—28 |

FOREIGN PATENTS

| | | |
|---|---|---|
| 174,715 | 1/1922 | Great Britain. |
| 420,037 | 4/1947 | Italy. |

RICHARD J. JOHNSON, *Primary Examiner.*

U.S. Cl. X.R.

180—65; 280—37